US006216740B1

(12) United States Patent
Hayashi et al.

(10) Patent No.: US 6,216,740 B1
(45) Date of Patent: Apr. 17, 2001

(54) MANIFOLD-TYPE SOLENOID VALVE WITH RELAY UNIT

(75) Inventors: Bunya Hayashi; Makoto Ishikawa, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/597,412

(22) Filed: Jun. 19, 2000

(30) Foreign Application Priority Data

Jul. 16, 1999 (JP) ................................................ 11-203410

(51) Int. Cl.[7] ...................................................... F16K 11/10

(52) U.S. Cl. ............................................ 137/884; 137/560

(58) Field of Search ...................................... 137/560, 884

(56) References Cited

U.S. PATENT DOCUMENTS 5,887,623 * 3/1999 Nagai et al. ........................ 137/884

* cited by examiner

*Primary Examiner*—John Fox
(74) *Attorney, Agent, or Firm*—Oblon, Spivak, McClelland, Maier & Neustadt, P.C.

(57) ABSTRACT

A plurality of manifold blocks connected together in a combined state have a plurality of solenoid valves for controlling a fluid pressure device by switching channels and at least one relay unit for controlling an electrical device by a relay that is opened and closed installed thereon, so that the manifold-type solenoid valve is assembled on the relay unit.

5 Claims, 4 Drawing Sheets

MANIFOLD-TYPE SOLENOID VALVE WITH RELAY UNIT

TECHNICAL FIELD

The present invention relates to a manifold-type solenoid valve in which a solenoid valve for controlling a fluid pressure device and a relay unit for controlling an electrical device are installed on a manifold block thereof.

BACKGROUND ART

In various types of automation apparatuses, a fluid pressure driving actuator such as an air cylinder and an electrical device such as an electrical motor are often used together. In general, such an actuator and an electrical device are each individually controlled by a manifold-type solenoid valve, a relay unit, and the like. In many cases, since such a solenoid valve and a relay unit are typically separately installed at separate places, the installation place for each unit must be secured, resulting in an increase in the size of the entire automation apparatus.

In addition, if the installation places for the solenoid valve and the relay unit are separated, not only is the wiring for feeding power or an operation signal separated and complicated, but also the solenoid valve and the relay unit must be separately handled, with the result that the installation and maintenance, such as checking the operation, are extremely troublesome.

DISCLOSURE OF THE INVENTION

It is a technical object of the present invention to provide a manifold-type solenoid valve with a relay unit, in which the manifold-type solenoid valve and the relay unit are integrated in one place so that the number of installation places is reduced, a control system and wiring are simplified, and the solenoid valve and the relay unit can be simultaneously handled.

In order to achieve the above object, according to the present invention, there is provided a manifold-type solenoid valve including a plurality of solenoid valves for controlling a fluid pressure device by switching channels, at least one relay unit for controlling an electrical device by a relay that is opened and closed, and a plurality of manifold blocks connected together in a combined state, each having substantially the same structure and each having the solenoid valve and the relay unit installed on a mounting surface thereof.

The plurality of manifold blocks each have the mounting surface on which a plurality of channel holes for supplying the solenoid valve with pressure fluids are opened, and a power-feeding connector for connecting a power-receiving connector provided for the solenoid valve. The relay unit has a housing that is formed so as to be mounted on the mounting surface of the manifold block within a width of the block, the relay that is built in the housing and is electrically opened and closed, a power-receiving connector that can be connected to the power-feeding connector of the manifold block, and a sealing section for sealing each channel hole on the mounting surface.

The manifold-type solenoid valve having the foregoing construction according to the present invention is constructed to mount the relay unit on the manifold block for mounting the solenoid valve, thereby enabling the solenoid valve for controlling the fluid pressure device and the relay unit for controlling the electrical device to be integrated in one device. Thus, not only can a separate installation place for the relay unit be omitted, but also an energizing system can be unified so that a control system and wiring can be simplified. Further, by integrating the relay unit and the solenoid valve with respect to the installation place and electricity, the relay unit an the solenoid valve can be simultaneously handled, and the installation and maintenance, such as checking the operation, can be easily performed.

According to the present invention, preferably, the housing of the relay unit is formed to have substantially the same outward shape as the solenoid valve.

According to an embodiment of the present invention, the housing of the relay unit has a hollow section air-tightly sealed by a cover, and the relay is enclosed in the hollow section. One end surface in a longitudinal direction of the housing serves as an output surface for connecting the relay to the electrical device, and a cord or a connector connecting to the relay is led to the outside from the output surface in an air-tightly sealed state.

According to another embodiment of the present invention, the manifold blocks each have a plurality of fluid channels which are connected to each channel hole on the mounting surface and are connected together between the blocks by coupling the manifold blocks, and male and female connectors which are electrically connected together for transmitting electrical power and a serial signal for controlling the solenoid valve, wherein the male connector is provided on one side surface of the manifold block and the female connector is provided on the opposite side surface thereof. When the manifold blocks are coupled, the male connector and the female connector of the adjacent manifold block are connected together.

DESCRIPTION OF THE PREFERRED EMBODIMENT

Figure 1:
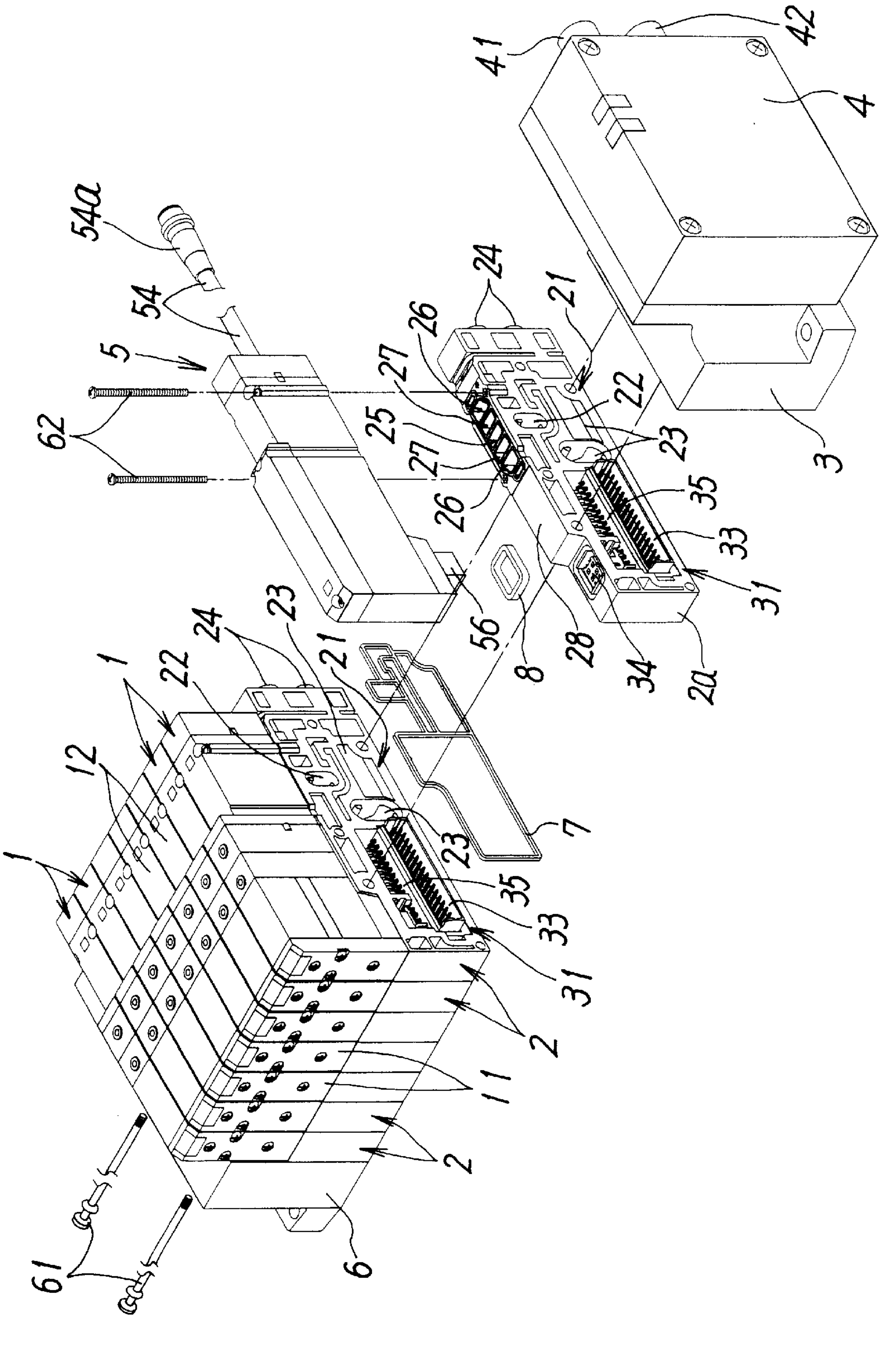
FIG. 1 is an exploded perspective view showing an embodiment of a manifold-type solenoid valve with a relay unit according to the present invention.

FIG. 1 shows an embodiment of a manifold-type solenoid valve with a relay unit according to the present invention. The manifold-type solenoid valve according to this embodiment has a plurality of solenoid valves 1 for controlling a fluid pressure device by switching channels of pressure fluids such as compressed air, a relay unit 5 for controlling an electrical device by a relay unit which is opened and closed, and a plurality of modular manifold blocks 2 connected together and each having the solenoid valve 1 and the relay unit 5 installed thereon. Such a manifold-block train has a supply/exhaust block 3 connected to one end thereof so as to supply therefrom each solenoid valve 1 with the pressure fluids through common channels 22 and 23 in each manifold block 2. In addition, the supply/exhaust block 3 has an intermediate block 4 attached thereto to feed therefrom electrical power for driving via each manifold block 2, while transmitting a serial signal to a circuit element provided for each manifold block 2 to switch a solenoid-valve driving circuit, thereby selectively controlling the solenoid valve 1 ON/OFF.

Figure 2:
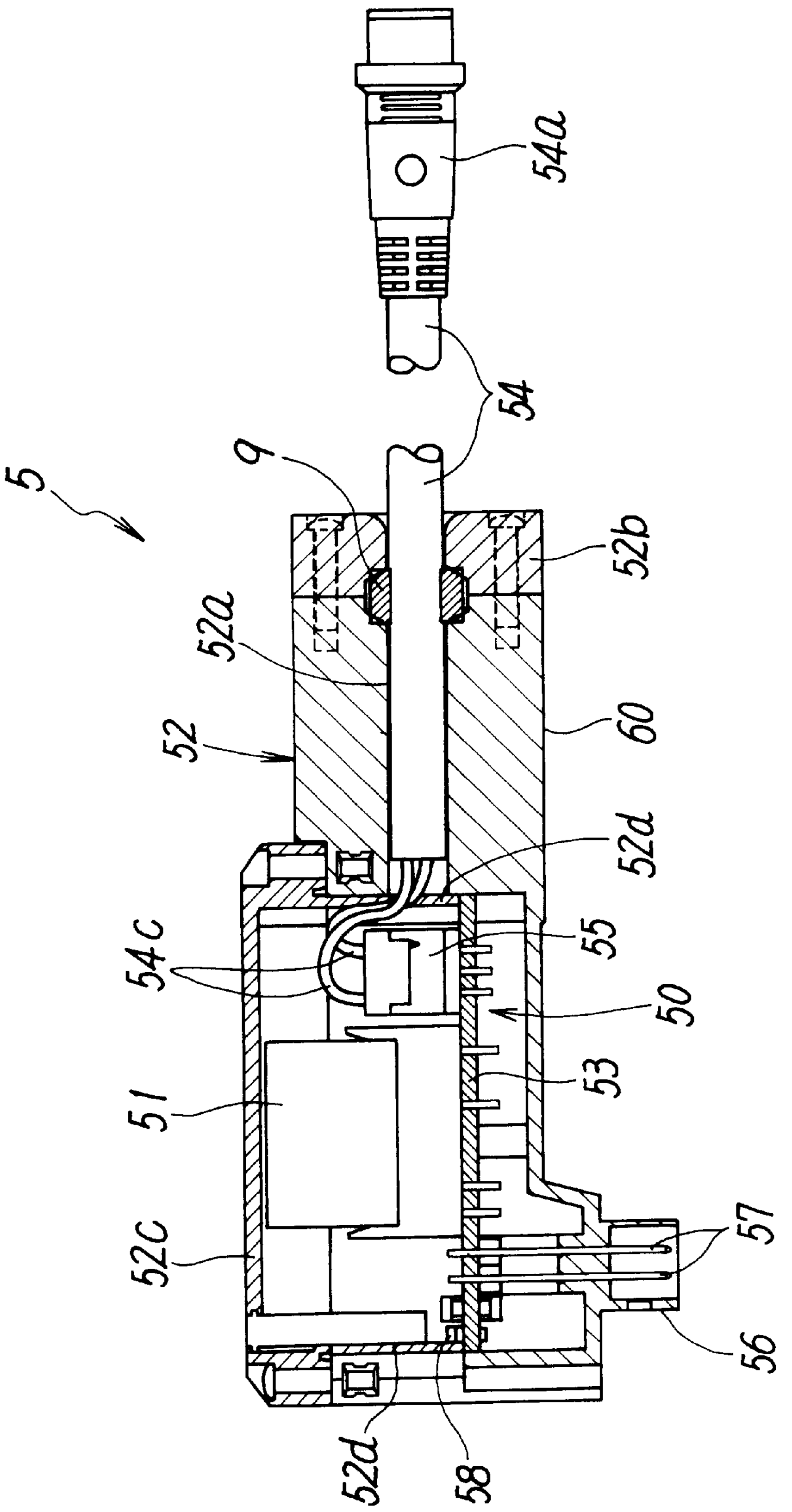
FIG. 2 is a cross-sectional view of the relay unit according to the embodiment.
Figure 3:
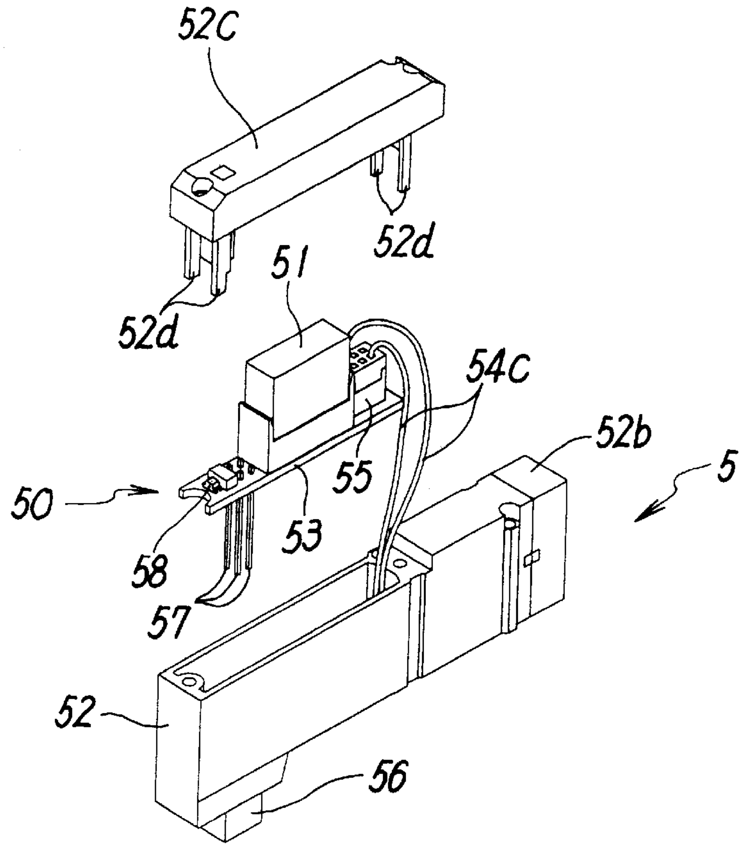
FIG. 3 is an exploded perspective view of the relay unit in FIG. 2.

Part of the plurality of manifold blocks 2 having substantially the same shape and the same structure is used for installing the relay unit, wherein the manifold block 2*a* of the relay unit has the relay unit 5 installed thereon, as shown in FIG. 2, having a relay 51 for controlling the electrical device such as an electrical motor in a housing 52. The manifold block 2*a* is denoted by a common symbol "2", except when discriminating from the other manifold blocks for installing the solenoid valve.

In addition, the relay unit 5 preferably has the housing 52 having the same or similar outward shape as/to the solenoid valve 1 when considering the overall design of the manifold-type solenoid valve. Further, in the embodiment in FIG. 1, the relay unit manifold block 2*a* is arranged at the end portion of the train so as to come into contact with the supply/exhaust block 3.

The solenoid valve 1 includes 3-port or 5-port type main valves 12 and one or more solenoids to drive the main valves 12 via pilot valves 11 electromagnetically driven by the solenoid or directly by the solenoid to switch the fluid channels, and is fixed on a mounting surface 28 on the manifold block 2 using screws.

In addition, a mounting surface of the bottom of the solenoid valve 1 corresponding to the manifold block 2 is provided with a power-receiving connector electrically connected to a power-feeding connector 34 on the mounting surface 28. The power-receiving connector has substantially the same structure as a power-receiving connector 56 of the relay unit 5, which will be described below.

Further, the solenoid valve 1 is preferably constructed in a manner such that any of the 3-port and 5-port solenoid valves has the same outward shape in which only the internal mechanism is different in order to use the common manifold block 2.

The manifold block 2 includes a fluid channel section 21 and an electrical circuit section 31. The fluid channel section 21 includes the common supply channel 22 and the two common exhaust channels 23 and 23, which bore through the manifold block 2 in a connecting direction and which are connected to channels in the supply/exhaust block 3 (not shown), two output ports 24 and 24 opened on one end surface in a longitudinal direction of the manifold block 2, and output channels for enabling output fluids from the solenoid valve 1 to flow in the output ports 24 and 24. In addition, the mounting surface 28 on the manifold block 2 has a supply channel hole 25, an exhaust channel hole 26, and an output channel hole 27 opened thereon for connecting the common channels and the output channels to supply/exhaust openings on a mounting surface at the bottom of the solenoid valve 1, respectively.

In addition, the electrical circuit section 31 includes a printed-circuit board 35 on which a circuit element and the like for switching a driving circuit of the solenoid valve by the serial signal from the intermediate block 4 are installed, a male connector 33 and a female connector (not shown) for receiving electrical power and for transmitting the serial signal, and the power-feeding connector 34 for feeding electrical power to the solenoid valve 1. These connectors are attached to the printed-circuit board 35, and are electrically connected together by printed wiring provided on the circuit board 35. The male connector 33 is placed on one side of the manifold block 2 and the female connector is placed on the opposite side of the male connector 33. When the manifold blocks are connected together, the male connector 33 and the female connector of the adjacent manifold blocks 2 and 2 are connected together.

The supply/exhaust block 3 includes a supply port and an exhaust port (not shown) on one end surface thereof, to which a supply coupling and an exhaust coupling are attached. These ports are each connected to the common supply channel 22 and the common exhaust channels 23 and 23 which bore through the manifold block 2, so that a supply fluid from the outside is supplied to the common supply channel 22, and an exhaust fluid from each solenoid valve 1 is exhausted through the common exhaust channels 23 and 23.

The intermediate block 4 attached to the supply/exhaust block 3 receives and relays the serial signal transmitted from a control system, and receives electrical power for driving from a power supply unit, and then transmits and supplies it to each manifold block 2 via connection terminals 41 and 42, while transmitting the serial signal and supplying the driving power to a control device such as other manifold-type solenoid valves.

The transmission of the serial signal and the power supply to each manifold block 2 by the intermediate block 4 are performed via the supply/exhaust block 3. That is, the supply/exhaust block 3 has the female connector (not shown) on the coupling surface thereof corresponding to the manifold block 2*a*, wherein the female connector is connected to the male connector 33 of the manifold block 2*a*, and is connected to the intermediate block 4.

An end block 6 attached to another end of the train of the manifold blocks 2 is connected to the supply/exhaust block 3 using tension bolts 61 to close end portions of the common channels 22 and 23 and the like provided by boring through the manifold blocks 2. Upon connection, gaskets 7 intervene between the manifold blocks 2, between the manifold block 2 and the supply/exhaust block 3, and between the manifold block 2 and the end block 6, to individually seal the fluid channel section 21 and the electrical circuit section 31 in the manifold block 2.

The end block 6 includes a male connector connected to the female connector of the adjacent manifold block 2. A serial signal transmitted via the male connector is converted to a return signal by a short-circuit line built in the end block 6, and is then transmitted to the intermediate block 4 via the male connector.

Figure 4:
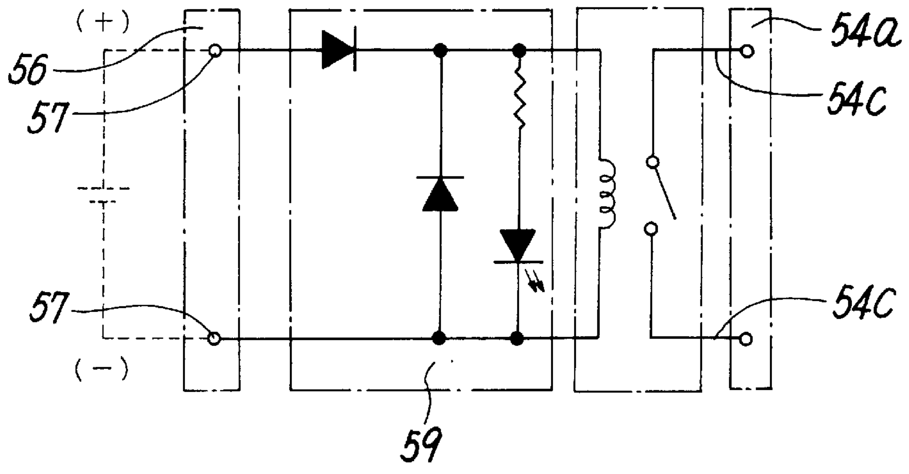
FIG. 4 is a circuit diagram of the relay unit.

The relay unit 5 installed on the relay unit manifold block 2*a* is fixed on the mounting surface 28 of the manifold block using screws 62, and includes the housing 52 constructed to have substantially the same shape as the solenoid valve 1 so as not to stick out from the mounting surface 28 in a width direction, in which an electrical circuit member 50, which will be shown in detail in FIG. 2 and FIG. 4, is built in a hollow section thereof. The electrical circuit member 50 includes the following on a substrate 53: the relay 51 electromagnetically or electronically opened and closed (FIG. 4 shows an electromagnetic relay); an intermediate terminal 55 connected to the relay 51 by the wiring on the substrate 53; a cord 54 having conductors 54*c* from the intermediate terminal 55 therein; a power-receiving connector 56 having power-receiving terminals 57 electrically connected to the relay 51; and electronic parts 59 such as an indicator lamp 58, a diode, and a resistor. In addition, the electrical circuit member 50 is stably pressed by support sections 52*d* of a cover 52*c* to such an extent that it does not move in the housing 52 for air-tightly sealing an upper surface portion of the housing 52.

The mounting surface at the bottom of the housing 52 corresponding to the manifold block 2*a* is provided with the power-receiving connector 56 electrically connected to the power-feeding connector 34 of the manifold block 2*a*, and a channel-hole sealing section 60 for air-tightly sealing the supply channel hole 25, the exhaust channel hole 26, and the output channel hole 27, which are opened on the mounting surface 28 of the manifold block 2*a*.

The channel-hole sealing section 60 is formed in a manner such that the portion corresponding to each channel hole of the mounting surface of the housing 52 is made flat so as to press the entirety of each gasket attached to peripheries of the openings of channel holes, thereby air-tightly sealing each channel hole to maintain air-tightness of the common channels 22 and 23.

In addition, the housing 52 is constructed to maintain air-tightness in a manner such that the power-receiving connector 56 is connected via a sealing member 8 to the power-feeding connector 34 of the relay unit manifold block 2*a*, and the cord 54 is air-tightly sealed by an O-ring 9 attached to a lead-out section 52*a* of the housing 52. Specifically, as shown in FIG. 2, the O-ring 9 fitted to the cord 54 is pressed and deformed by an end plate 52*b* on the lead-out side of the cord 54 of the housing 52 so as to seal a gap between the lead-out section 52*a* and the cord.

The relay unit 5 is operated as the inner relay 51 receives electrical power from the power-feeding connector 34 of the manifold block 2*a* via the power-receiving connector 56 to turn on/off the electrical device connected to a plug 54*a*. The power supply to the relay 51 via the power-feeding connector 34 is controlled at the manifold block 2*a* by the serial signal from the intermediate block 4 in a manner similar to the case in the solenoid valve 1.

Figure 5:
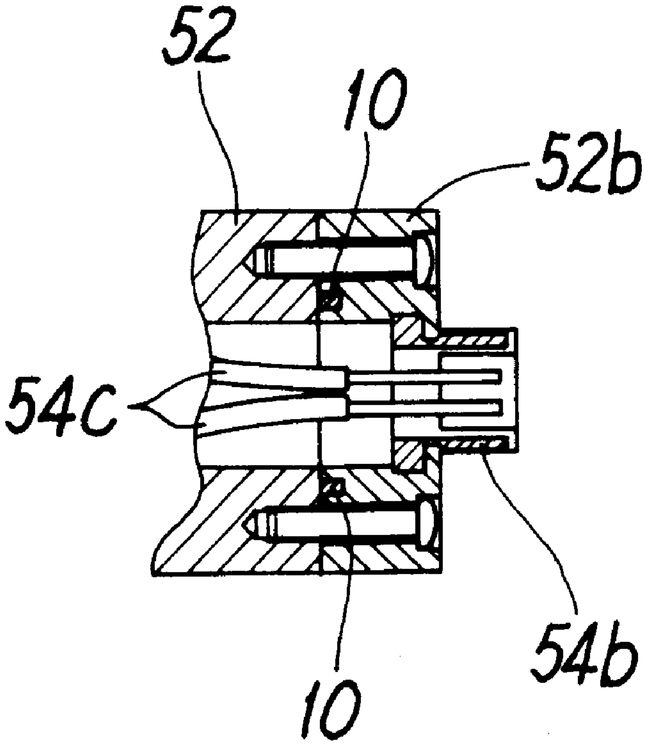
FIG. 5 is a cross-sectional view of an essential part showing an embodiment different from the relay unit in FIG. 2.

According to this embodiment, the relay unit 5 is constructed to allow the cord 54 from the relay 51 to be led out from the housing 52 and to output a driving signal and the like by the output plug 54*a* at the tip thereof, however, as shown in FIG. 5, it can also be constructed to have an output connector 54*b* on the end plate 52*b* for wiring in place of the output plug 54*a*, while connecting the conductors 54*c* of the cord 54 thereto.

In this case as well, it is necessary that the gaskets 10 intervene between the end plate 52*b* to which the output connector 54*b* is attached and the housing 52 so as to maintain air-tightness in the housing.

In the manifold-type solenoid valve having the foregoing construction, the serial signal from the control system and the electrical power for driving from the power supply unit are transmitted and supplied to the intermediate block 4 together, and are then transmitted and supplied to the manifold block 2 therefrom via an energizing mechanism, whereby the solenoid valve 1 and the relay unit 5 are driven based on the serial signal.

Since the relay unit 5 uses part of a plurality of manifold blocks 2 as a relay unit manifold block 2*a* to be installed thereon, and is integrally assembled to part of the manifold type solenoid valve, there is no need to separately install the relay unit 5 in another place. Moreover, since parts can be used commonly, manufacturing costs can be reduced.

Further, since the relay unit 5 and the manifold-type solenoid valve are collected so as to unify the energizing mechanism, not only can the control system and the wiring be simplified, but also the relay unit 5 and the manifold-type solenoid valve can be simultaneously handled, thereby easily performing the installation and maintenance such as checking the operation.

In the above embodiment, only one relay unit 5 is used, however, it is also possible to use a plurality of relay units by increasing the number of relay unit manifold blocks 2*a*.

In addition, in this embodiment, the relay unit manifold block 2*a* is arranged at a position that comes into contact with the supply/exhaust block 3 at an end portion of the train, however, the position at which the manifold block 2*a* is installed may be any position in principal.

Further, in the embodiment, although the driving of the relay unit 5 and the solenoid valve 1 is controlled by the serial signal, it is also possible to use any control device that can control the power supply to the relay unit 5 and the solenoid valve 1 via the energizing mechanism of the driving power.

As described above in detail, since the manifold-type solenoid valve with the relay unit according to the present invention uses part of a plurality of manifold blocks as a relay unit manifold block to install the relay unit thereon, the relay unit and the manifold-type solenoid valve can be integrated in one device so that it is possible not only to omit a separate installation place for the relay unit, but also to unify the energizing mechanism, thereby simplifying the control system and the wiring. In addition, by integrating the relay unit and the manifold-type solenoid valve with respect to the installation place and the electricity, the relay unit and the solenoid valve can be simultaneously handled so that the installation and maintenance, such as checking the operation, can be easily performed.

What is claimed is:

1. A manifold-type solenoid valve with a relay unit, characterized by comprising:

a plurality of solenoid valves for controlling a fluid pressure device by switching channels, at least one relay unit for controlling an electrical device by a relay that is opened and closed, and a plurality of manifold blocks connected together in a combined state each having said solenoid valve and the relay unit installed on the mounting surface thereof and having substantially the same construction;

wherein said plurality of manifold blocks each have said mounting surface on which a plurality of channel holes for supplying pressure fluids to said solenoid valves are opened and a power-feeding connector for connecting a power-receiving connector provided for said solenoid valve; and said relay unit has a housing formed to be installed on the mounting surface of said manifold block within a width of the block, said relay which is built in the housing and is electrically opened and closed, the power-receiving connector that can be connected to the power-feeding connector of said manifold block, and a sealing section for sealing each channel hole on said mounting surface.

2. A manifold-type solenoid valve as in claim 1, characterized in that the housing of said relay unit has substantially the same outward shape as said solenoid valve.

3. A manifold-type solenoid valve as in claim 1, characterized in that the housing of said relay unit has a hollow section air-tightly sealed by a cover, the hollow section has said relay enclosed therein, one end surface in a longitudinal direction of the housing serves as an output surface for connecting said relay to the electrical device, and a cord or a connector which is connected to said relay is led to the outside from the output surface in an air-tightly sealed state.

4. A manifold-type solenoid valve as in claim 1, characterized in that said manifold blocks each have a plurality of fluid channels which are connected to each channel hole on said mounting surface and which are connected together between the blocks by coupling the manifold blocks, and a male connector and a female connector, which are electrically connected together for supplying/transmitting electrical power and a serial signal for controlling said solenoid valve; the male connector is provided on one side of said manifold block; and the female connector is provided on the opposite side thereof so that when the manifold blocks are coupled, the male connector and the female connector of the adjacent blocks are connected together.

5. A manifold-type solenoid valve as in claim 4, characterized in that said plurality of manifold blocks have a supply/exhaust block for supplying the pressure fluids to each manifold block attached to a connecting end thereof; and the supply/exhaust block has an intermediate unit attached thereto for supplying said electrical power and serial signal supplied/transmitted from control means to the connector of said manifold block.

* * * * *